United States Patent
Tang et al.

(10) Patent No.: US 10,163,077 B2
(45) Date of Patent: Dec. 25, 2018

(54) PROXY FOR ASYNCHRONOUS MEETING PARTICIPATION

(71) Applicant: Microsoft Technology Licensing, LLC, Redmond, WA (US)

(72) Inventors: John C. Tang, Palo Alto, CA (US); Aaron Hoff, Kirkland, WA (US); Kori Inkpen, Redmond, WA (US); Paul Johns, Tacoma, WA (US); Asta Roseway, Bellevue, WA (US); Chen Zhao, San Jose, CA (US); Xiang Cao, Beijing (CN); Jennifer Marlow, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/231,437

(22) Filed: Aug. 8, 2016

(65) Prior Publication Data

US 2016/0350724 A1    Dec. 1, 2016

Related U.S. Application Data

(63) Continuation of application No. 13/304,371, filed on Nov. 24, 2011, now Pat. No. 9,471,902.

(51) Int. Cl.
| | |
|---|---|
| *G06F 17/30* | (2006.01) |
| *G06Q 10/10* | (2012.01) |
| *H04L 29/06* | (2006.01) |
| *H04L 29/08* | (2006.01) |

(52) U.S. Cl.
CPC ... *G06Q 10/1095* (2013.01); *G06F 17/30056* (2013.01); *G06F 17/30058* (2013.01); *G06F 17/30598* (2013.01); *H04L 65/403* (2013.01); *H04L 67/28* (2013.01); *G06F 17/30* (2013.01)

(58) Field of Classification Search
CPC ......... G06F 17/30056; G06F 17/30058; G06F 17/30; G06F 17/30598; G06Q 10/1095; H04L 65/403
See application file for complete search history.

(56) References Cited

U.S. PATENT DOCUMENTS

| | | |
|---|---|---|
| 8,635,293 B2 | 1/2014 | Fisher et al. |
| 2005/0210393 A1 | 9/2005 | Maeng |
| 2007/0005812 A1 | 1/2007 | Moore |
| 2008/0184122 A1 | 7/2008 | Grant et al. |
| 2009/0307189 A1 | 12/2009 | Bobbitt et al. |

(Continued)

OTHER PUBLICATIONS

"Final Office Action Issued in U.S. Appl. No. 13/304,371", dated Sep. 11, 2015, 17 Pages.

(Continued)

*Primary Examiner* — Manglesh M Patel
*Assistant Examiner* — Nicholas Hasty (57) ABSTRACT

Embodiments described herein relate to enabling a lightweight way of recording and sharing video messages intended to provide input to a future meeting that cannot be personally attended. A person who cannot attend the meeting pre-records their thoughts and remarks for the meeting as video clips for presentation at the meeting. A physical device with at least a display is presented at the meeting. The physically present participants can play the pre-recorded clips on the device. Video of participants' responses to the clips is recorded and made available so that the represented attendee can view the participants' responses.

20 Claims, 8 Drawing Sheets

(56) References Cited

U.S. PATENT DOCUMENTS

| | | |
|---|---|---|
| 2009/0319916 A1* | 12/2009 | Gudipaty ............ G06Q 10/109 715/753 |
| 2009/0327425 A1 | 12/2009 | Gudipaty |
| 2010/0037151 A1 | 2/2010 | Ackerman et al. |
| 2010/0100594 A1 | 4/2010 | Frees et al. |
| 2010/0138756 A1 | 6/2010 | Saund et al. |
| 2010/0205541 A1* | 8/2010 | Rapaport ............... G06Q 10/10 715/753 |
| 2011/0107236 A1* | 5/2011 | Sambhar ............ H04L 12/1822 715/753 |
| 2011/0122220 A1 | 5/2011 | Roberts et al. |
| 2011/0134204 A1 | 6/2011 | Rodriguez et al. |
| 2012/0041759 A1* | 2/2012 | Barker .................. H04H 60/05 704/201 |
| 2012/0260195 A1 | 10/2012 | Hon et al. |
| 2012/0317210 A1 | 12/2012 | Fisher et al. |
| 2015/0081629 A1 | 3/2015 | Newman et al. |

OTHER PUBLICATIONS

"Non Final Office Action Issued in U.S. Appl. No. 13/304,371", dated May 8, 2015, 15 Pages.

"Notice of Allowance Issued in U.S. Appl. No. 13/304,371", dated Jun. 22, 2016, 8 Pages.

Adam, et al., "Distributed Research Teams: Meeting Asynchronously in Virtual Space", In Proceedings of the 32nd Hawaii International Conference on System Sciences, Jan. 5, 1999, 10 Pages.

Lachut, Scott, "The Next Step in Social Media: Asynchronous Video Conversations", Retrieved from <<http://www.psfk.com/2011/01/the-next-step-in-social-media-asynchronous-video-conversations.html>>, Jan. 11, 2011, 9 Pages.

Watt, et al., "Asynchronous Videoconferencing: A Hybrid Communication Prototype", In Proceedings of the 35th Hawaii International Conference on System Sciences, Jan. 7, 2002, 9 Pages.

* cited by examiner

PROXY FOR ASYNCHRONOUS MEETING PARTICIPATION

RELATED APPLICATIONS

This application is a continuation patent application of copending application with Ser. No. 13/304,371, filed Nov. 24, 2011, entitled "PROXY FOR ASYNCHRONOUS MEETING PARTICIPATION", which is now allowed. The aforementioned application(s) are hereby incorporated herein by reference.

BACKGROUND

Due to busy schedules and time zone differences, it can be difficult for a person to attend a meeting. Participants with large time zone differences may be limited to attending at inconvenient times of day. Some participants may not be able to attend. Although a meeting may be video recorded to allow participants unable to attend to catch up on the discussion at the meeting, reviewing recorded meetings can be tedious and time-consuming and offers no opportunity to interact during the meeting. Generally it is difficult for someone to obtain the benefits of a meeting without actually attending the meeting in real time.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments described herein relate to enabling a lightweight way of recording and sharing video messages intended to provide input to a future meeting that cannot be personally attended. A person who cannot attend the meeting pre-records their thoughts and remarks for the meeting as video clips for presentation at the meeting. A physical device with at least a display is presented at the meeting. The physically present participants can play the pre-recorded clips on the device. Video of participants' responses to the clips is recorded and made available so that the represented attendee (not physically present at meeting) can view the participants' responses.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to allowing a person who cannot attend a meeting to create a proxy representative that represents the person at the meeting. The proxy representative allows the represented attendee to asynchronously interact with the meeting without attending in person. The proxy representative may function as a simulation of the represented attendee, for example by providing pre-recorded video messages of the represented attendee that can be triggered by participants at the meeting. Moreover, the proxy representative may capture reactions of participants to the pre-recorded video messages, which the represented attendee can later review.

Discussion of embodiments will proceed with an overview of the general approach of authoring a proxy representative, using the proxy representative at a meeting, and after the meeting the viewing information captured by the proxy representative during the meeting. Following the general overview, each of these three stages will be described in detail.

Figure 1:
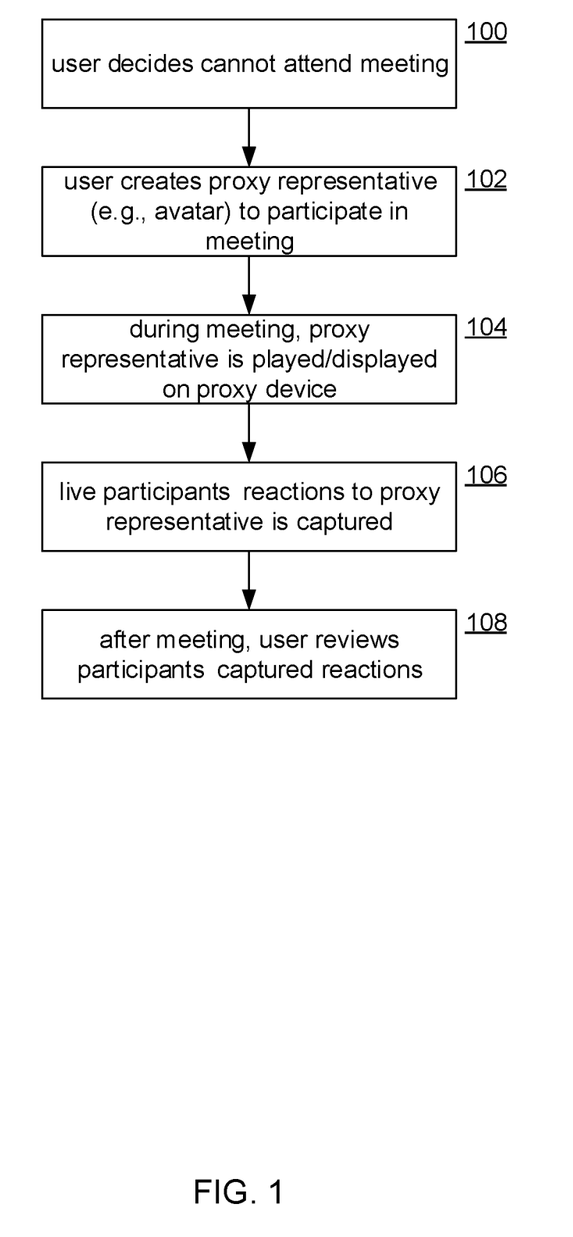
FIG. 1 shows a general process for using a proxy device.

FIG. 1 shows a general process for using a proxy device. At step 100, a user decides that he or she cannot attend a scheduled meeting, for example, due to a schedule conflict or a large time zone difference. At step 102, the user creates a proxy representative to participate in the meeting in place of the user. This may involve the user creating content or media to be conveyed to participants of the meeting, for example in the form of notes or pre-recorded video clips of the user addressing the meeting. At step 104, during the meeting the proxy representative, embodied on a proxy device such as a display, tablet, terminal, etc., is played or displayed. The proxy representative may have a default video loop of the represented attendee that plays on the device until a participant interacts with the proxy representative to cause the proxy representative to display or play some of the pre-recorded video or content. At step 106, reactions of the live participants to playing of the pre-recorded video clips or other content are captured and correlated with the displayed output or content (topics) of the proxy representative. At step 108, after the meeting is over, the represented attendee reviews the captured portions of the meeting, for example portions that follow the playing of a pre-recorded video clip and presumably containing reactions of attendees to the pre-recorded video clip.

In effect, the proxy representative enables a lightweight way to record and share video messages intended to serve as input to a pending meeting that cannot be personally attended. The represented attendee pre-records their thoughts in a series of video messages for presentation at the meeting and their absence. Reactions and responses to those thoughts are recorded in the meeting for the represented attendee to review later. This form of asynchronous video messaging may encourage interaction among team members without all members having to meet synchronously.

Figure 2:
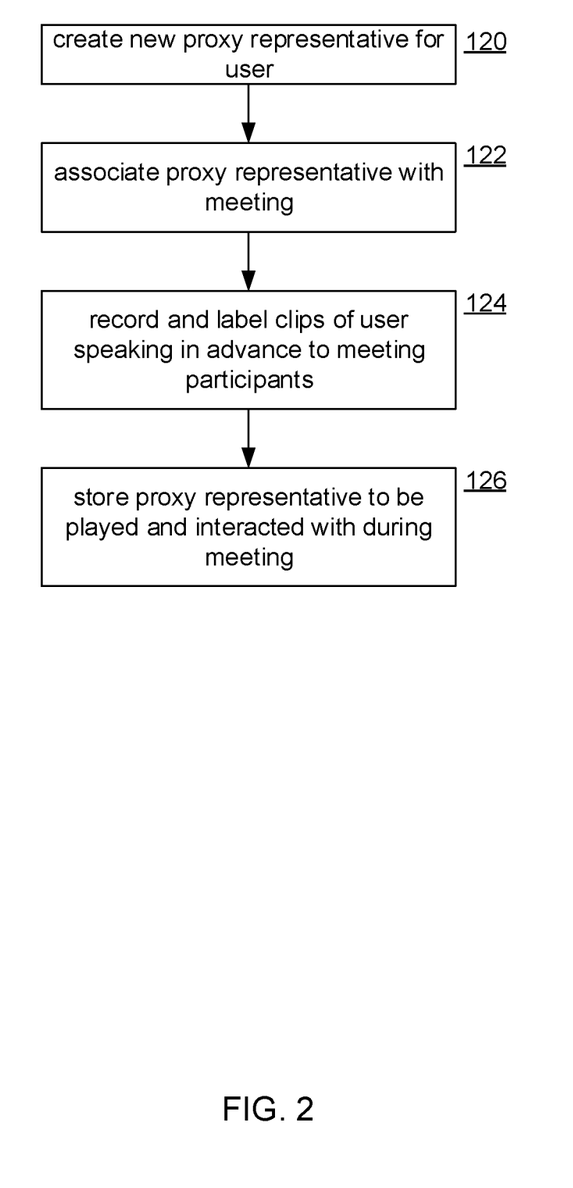
FIG. 2 shows a process for creating a proxy representative.

FIG. 2 shows a process for creating a proxy representative. At step 120, the represented attendee (user) begins to create a new proxy representative. At step 122, the user may select or indicate a particular meeting that the user will attend by proxy. At step 124, a user interface is displayed to allow a lightweight way for the user to record video clips or messages, label or title messages, create annotations, link to documents, etc. At step 126, the proxy representative of the user is stored and is ready to be played and interacted with during the upcoming meeting.

To elaborate, a lightweight mechanism is provided to allow the represented attendee to pre-record video messages. This allows the user to create short clips that capture thoughts to be contributed to the meeting. In one embodiment the recording mechanism is integrated with meeting scheduling software, allowing the pre-recorded messages to be distributed to the participants in advance and making them available during the meeting. In one embodiment, a video recording program associates a subject heading or title with each of the pre-recorded video messages (similar to video mail). The recording program may also record a video loop avatar, which serves as a default representation of the represented attendee that will play continually during the meeting to remind physically present participants of the participation of the represented attendee. In one variation, the avatar need not be only visual; the avatar may comprise subtle sounds or any media that indicates the presence of a person. That is, a proxy representative may have media such as video, captured images, audio, etc. This avatar can be expressly recorded or it can be extracted from the topical pre-recorded video messages. In practice, video messages may be pre-recorded at a user's workstation or other terminal and stored in the data layer of an n-tier application for later access by a proxy device or equivalent during the meeting. In another embodiment, a proxy device such as a tablet or laptop may record and store the pre-recorded video clips locally. In either case, the proxy device may be present at the meeting and may continually display the default avatar clip (or other media) and play message clips as needed.

Regarding the recording program, a number of enhancements may be implemented to improve the exchange of information between the represented attendee and the other attendees. Subtle improvements in the quality of the content of pre-recorded messages may be obtained by displaying clips or images of attendees while the represented participant is recording messages. In an integrated messaging system, the system might retrieve and display avatar clips or images previously generated by the other attendees. Seeing the attendees while recording may cause the messages to be more direct and personable and may help avoid the impersonal qualities similar to telephone answering machine messages. In other words, techniques may be used to help evoke conversational qualities in the recorded messages. While messages are recorded, to avoid overly long messages, some visual feedback may be provided to let the user know when a message may be running long. For example, a ticking clock, a progress bar, or other graphic or animation may be displayed.

Regarding the automatic avatar generation mentioned above, a set of one or more default loops can be automatically generated by analyzing the represented attendee's pre-recorded video messages. The analysis may involve identifying sequences with criteria such as: the represented attendee is not talking, has minimal movement, is facing the camera, etc. In some cases an overly realistic avatar loop might be initially perceived by physically present attendees as a live teleconference feed. Such attendees may have an embarrassed or negative reaction when they discover that the avatar is not the live actual person. Therefore, it may be helpful for the avatar to have properties that indicate that it is not a live person. In the case of video clips, the clips might be intentionally modified (e.g., speed, appearance, etc.) to reduce their realism. In one embodiment, the avatar may be only a series of cyclically displayed still images of the represented attendee, perhaps with transition effects.

In one embodiment, the avatar might be a single image, a rendering of a computer-generated model, etc. Generally, an avatar can take a variety of visual forms. In terms of behavior, the avatar may be either a static visual that provides a default representation of the represented attendee when the proxy representative is idle, or a dynamic visual that changes in response to input and conditions such as whether and who is currently talking, how long a person is talking, action the proxy attendant might be taking (e.g., recording feedback), etc. Note that these techniques for providing visual information to the represented participant can also be used when capturing feedback to a message during the meeting. For example, a visual indicating the passage of time while recording a reaction or a reply may be displayed. In another embodiment, the avatar might change appearance when feedback is being recorded. For example, where a slideshow or animation might be the default avatar, when the proxy device is recording an attendee speaking, the avatar might change to a realistic clip, e.g., a high quality clip of the represented participant appearing attentive and with minimal signs of having been pre-recorded. This may enhance the sense of conversation (albeit delayed) between the attendees and the represented attendee.

Figure 3:
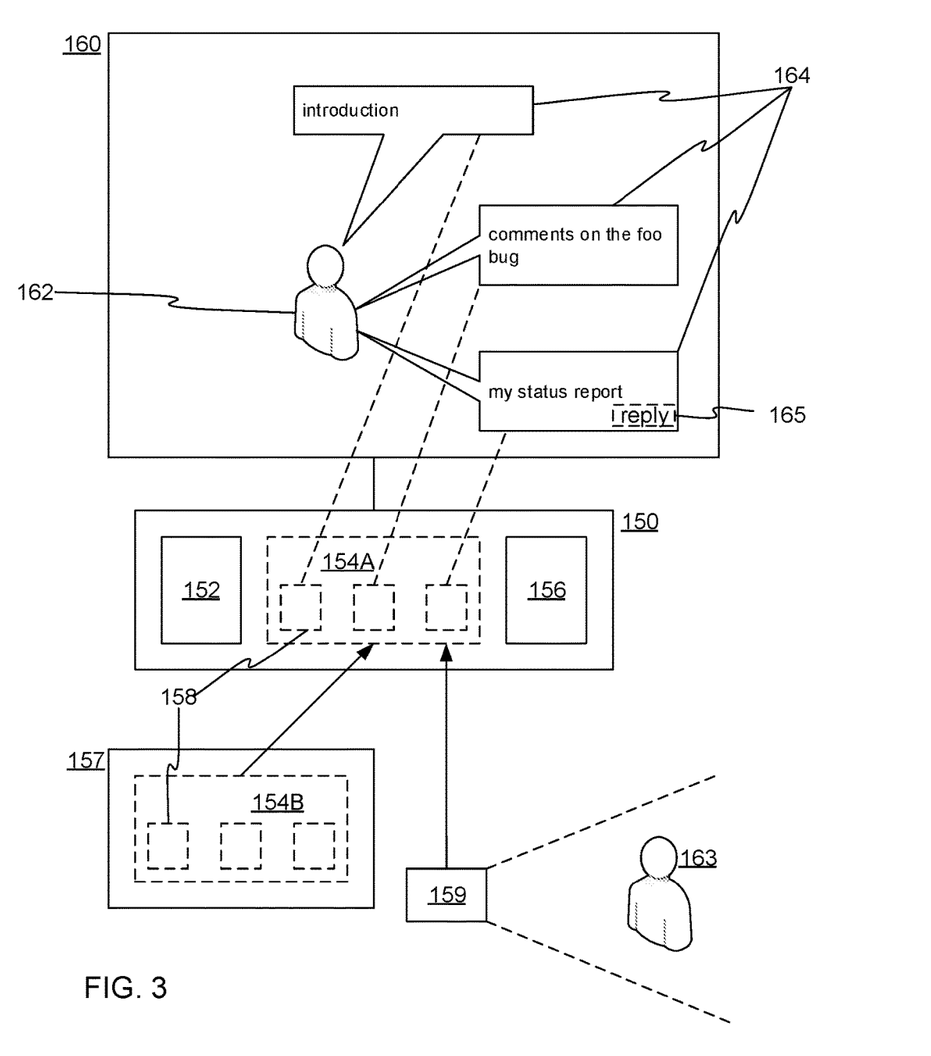
FIG. 3 shows an example of a proxy device that physically represents a person at a meeting.

FIG. 3 shows an example of a proxy device 150 that physically represents a person at a meeting. During the meeting the proxy device 150 presents the proxy representative, which can be interacted with by the meeting participants. The proxy device 150 may have a processor 152, volatile and/or nonvolatile storage 154A (e.g., memory, storage media, etc.), and input/output components 156 such as a touch screen, microphone, speakers, video camera, etc., as well as network facilities to communicate with a server 157 having storage 154B. The proxy device 150 may either stream or cache the pre-recorded video clips 158 to local storage 154A from server 157 (for rendering), or may store the clips locally without accessing the clips from storage 154B. The storage 154A/154B may also store titles, metadata, or other information related to the proxy representative, such as an identifier of the associated meeting. The pre-recorded video clips 158 of the represented participant 163 may have been captured with a camera 159. In one embodiment the proxy device 150 is a remote system or server, and another device acts as a terminal and communicates with the remote system or server. In either case, a display 160 displays the proxy representative 162 and possibly user interface elements 164.

In the example of FIG. 3, the user interface elements 164 indicate topics of the pre-recorded video clips 158 that are available to be played. For example, one element identifies an introduction clip, another element identifies a clip or message about a software bug, and another element identifies a clip about a status report. It will be appreciated that the user interface can vary in appearance and functionality; any approach can be used that allows a user to interact with the proxy device/representative to invoke particular pre-recorded messages, to direct feedback to the represented attendee, etc. In one embodiment a touch sensitive screen is used, and a pre-recorded message is played by a meeting participant by touching a corresponding bubble or user interface element 164. As discussed in detail below, the user interface of the proxy representative may also have a mechanism to allow users to submit impromptu messages to the proxy device/representative or to record feedback to a particular topic. For example, a user interface feedback button may be activated, causing the proxy device to capture video and store the video of the impromptu feedback for later viewing by the represented attendee.

In one embodiment, one or more of the user interface elements 164 may have a reply button 165 or other means for indicating to the proxy device that a message is to be recorded in association with the corresponding topic. In the example of FIG. 3, if a participant activates reply button 165, recording begins and the recorded clip is associated with the corresponding topic.

Figure 4:
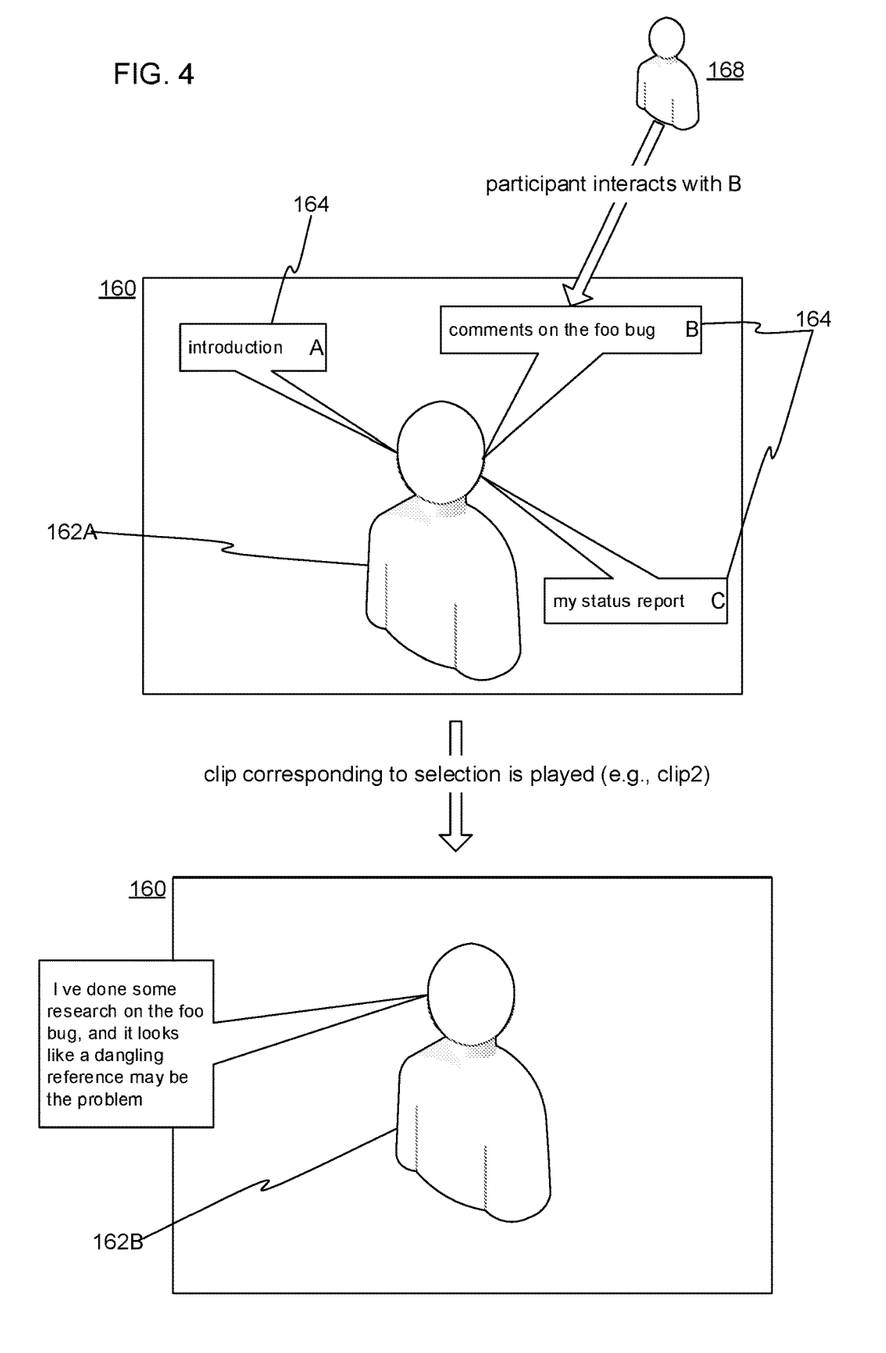
FIG. 4 shows an example interaction with a proxy representative.

FIG. 4 shows an example interaction with a proxy representative. Proxy representative 162A is shown in a default loop state; a default avatar loop is playing, for example, showing the represented attendee glimpsing around, blinking, and appearing attentive. During the meeting, a participant 168 interacts with the proxy representative/device, for example activating a user interface element 164, speaking a voice command, etc. In response to the input, a clip or pre-recorded video that corresponds to the selection is then played. On the display 160 the participant 168 sees the selected pre-recorded video clip being played, with a corresponding representation (graphic, video, image(s), etc.) of proxy representative 162B.

Figure 5:
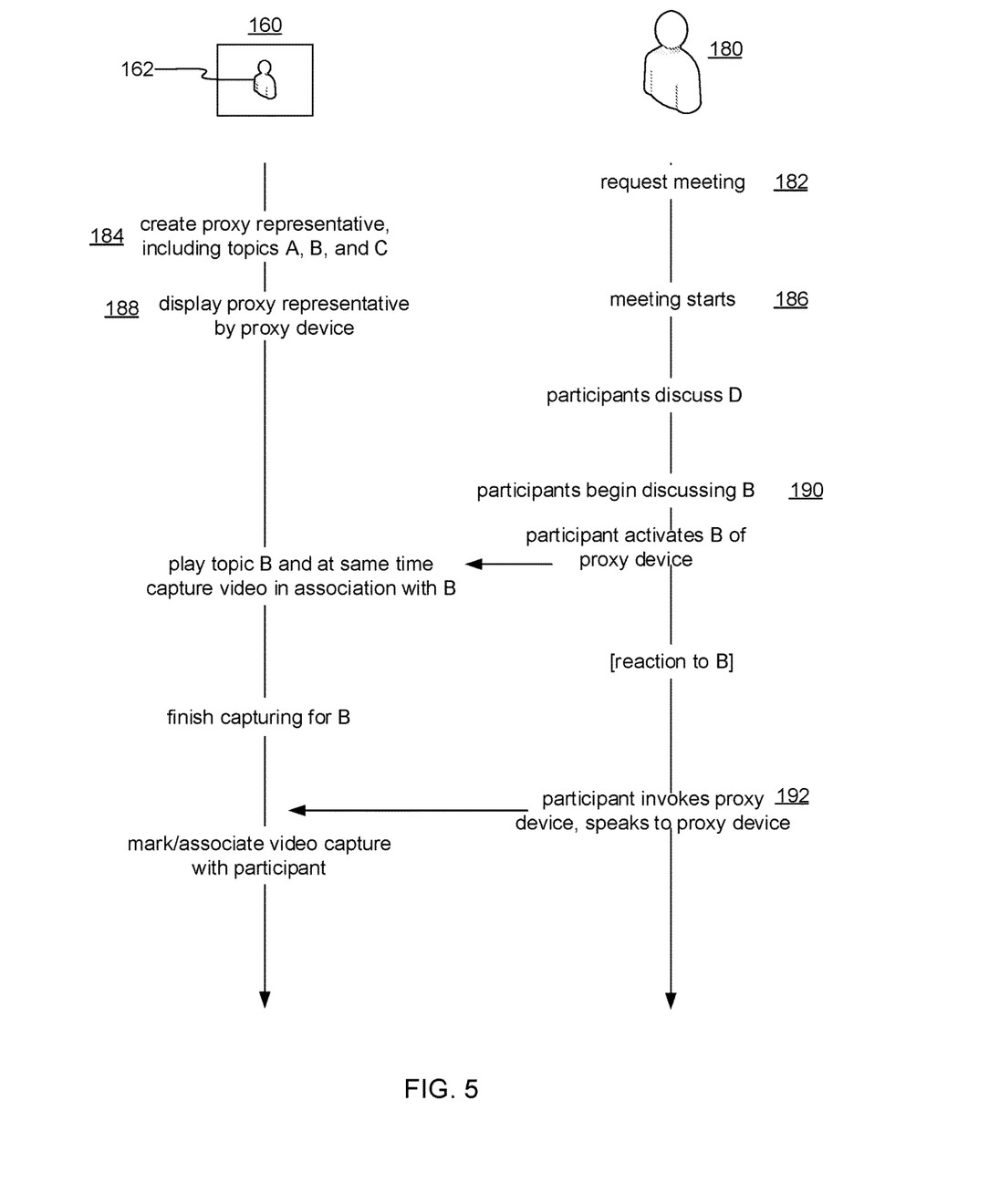
FIG. 5 shows a sequence of the proxy device at a meeting with at least one participant.

FIG. 5 shows a sequence of the proxy representative 162 at a meeting with at least one participant 180. Initially, at time 182 a meeting is requested. A person unable to attend, at time 184, creates a proxy representative as discussed above, pre-recording video clips of topics A, B, and C. At time 186 the meeting begins, and around the same time—at time 188—the proxy representative is activated and displayed on display 160 at the meeting. Note that the proxy device 150 need not be the device that was used to pre-record the vide messages 158. Note also that the two columns in FIG. 5 represent actions of the proxy device 150 and the meeting attendees, respectively.

During the meeting the participants may discuss various topics while the default avatar loop of the proxy representative 162 is playing. At time 190, when the physically present participants begin discussing topic B, participant 180 activates pre-recorded clip B of the proxy representative, causing the corresponding one of the pre-recorded video clips 158 to be played on the display 160. To allow the represented participant to later view reactions to the video clip, the proxy device 150 causes video of the meeting to be captured (or marked or associated) with reference to topic B. In other words, a select portion of the meeting, which is in close temporal proximity to activation of the clip, is automatically captured or indexed. Depending on implementation, the start and end time of the select portion can vary. For example, the start time might be some fixed time prior to playing of the clip (for example one minute), or the time when the clip began to play, or the time when the clip finished playing. The end time might be a fixed duration (for example five minutes), or a dynamic duration (for example, at a time when a lull is automatically detected), or when there is a new interaction with the proxy representative 162 (for example a new clip is played), etc.

Note that the captured or indexed portion of the meeting should include reaction of participants to the clip that was played. Note that during times when the proxy representative is inert (neither playing nor capturing video), the default avatar clip may be played. Furthermore, a special avatar clip may be played while the proxy device is capturing participant feedback. For example, a loop of the represented participant appearing attentive or listening carefully may be played. Feedback capture can be initiated as part of the message playback process, as discussed above, or feedback can be explicitly triggered. For example, after playing a pre-recorded message clip, the proxy representative/device may display a "reply" button to allow a participant to start recording feedback that will be associated with the pre-recorded message clip.

In one embodiment, the proxy device is configured to allow participants to direct impromptu feedback to the participant represented by the proxy. For example, referring to FIG. 5, at time 192, participant 180 interacts with the proxy device 150 to indicate that a comment is forthcoming, perhaps by using a voice command or feedback button on the display 160. In response the proxy device 150 captures or indexes video of participant 180 speaking to the device hosting the proxy representative.

In another embodiment, the proxy representative may include a user interface element that allows a participant to direct a feedback comment to a particular topic displayed by the proxy device. In other words, rather than automatically capturing feedback after playing a prerecorded video clip, it is also possible for a participant to interact with the proxy representative by selecting a particular topic, and the proxy device captures video of the participant and associates the video with the selected topic.

Figure 6:
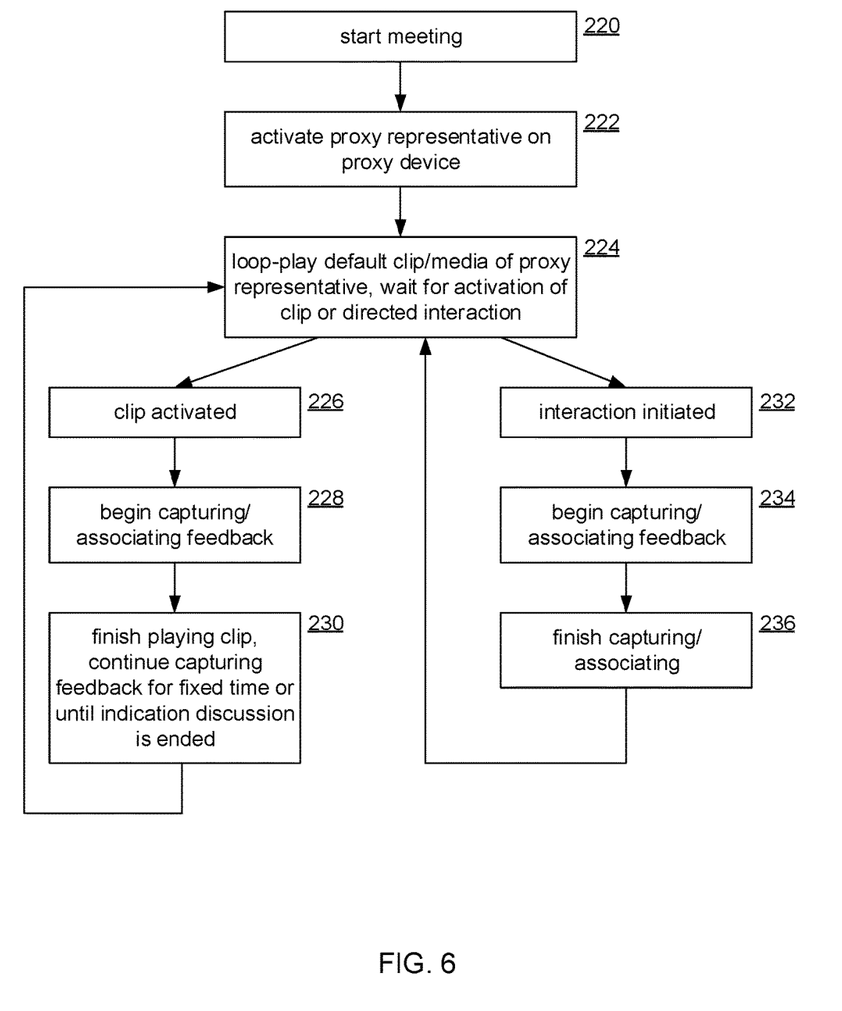
FIG. 6 shows a process performed by the proxy device.

FIG. 6 shows a process performed by the proxy device 150. At step 220 a meeting begins. At step 222 the proxy device 150 is activated. This may be done manually or may be triggered automatically such as by a signal from a meeting system that a meeting is about to begin. At step 224, when the proxy device 150 is idle, a default proxy representative clip (an avatar clip of the actual proxy participant) is repeatedly looped. For realism, a variety of non-speaking clips may be played randomly.

At some point during the meeting a pre-recorded clip is activated at step 226. Again, this may involve a physically present participant directing input to the device playing the proxy representative. The input may be a voice command, a touch on a touchscreen, a hand gesture recognized by a camera and gesture recognition system, an input on a participant's handheld device, mobile phone, or remote control that is forwarded to the represented participant, and so forth. Topics may be highlighted or suggested during the meeting if the proxy representative/device is configured with voice recognition and uses spoken keywords to identify topics relevant to the current discussion in the meeting. If an agenda is available, some topics can be brought to the fore (e.g., highlighted, animated, punctuated with a sound) at times indicated in the agenda. In conjunction with the clip being activated at step 226, the proxy representative causes capturing or associating of video of the meeting (presumably including participant feedback to the activated clip) with the activated clip. In other words, video of the meeting is captured or indexed in relation to the activated clip. At step 230 the activated clip completes and the capturing or indexing continues until some threshold duration (e.g., 30 to 60 seconds) or cutoff event occurs (e.g., no speech detected for a threshold time). The capturing or indexing may overlap with the looping of the avatar clip at step 224, which resumes when the activated clip and/or a listening avatar finishes playing. In yet another embodiment, participants may explicitly direct feedback to a particular topic or pre-recorded video clip.

When the proxy representative is not busy performing any of the steps mentioned above, a participant, at step 232, may initiate impromptu feedback for the proxy representative. This feedback may be either in association with a particular one of the topics (as with the reply button 165), for example, or the feedback may be general and unassociated. At step 234, the impromptu feedback is captured/indexed, which completes at step 236. Start and end times of the captured/indexed feedback clip may vary according to implementation, as discussed above regarding capturing feedback in response to pre-recorded clips.

Figure 7:
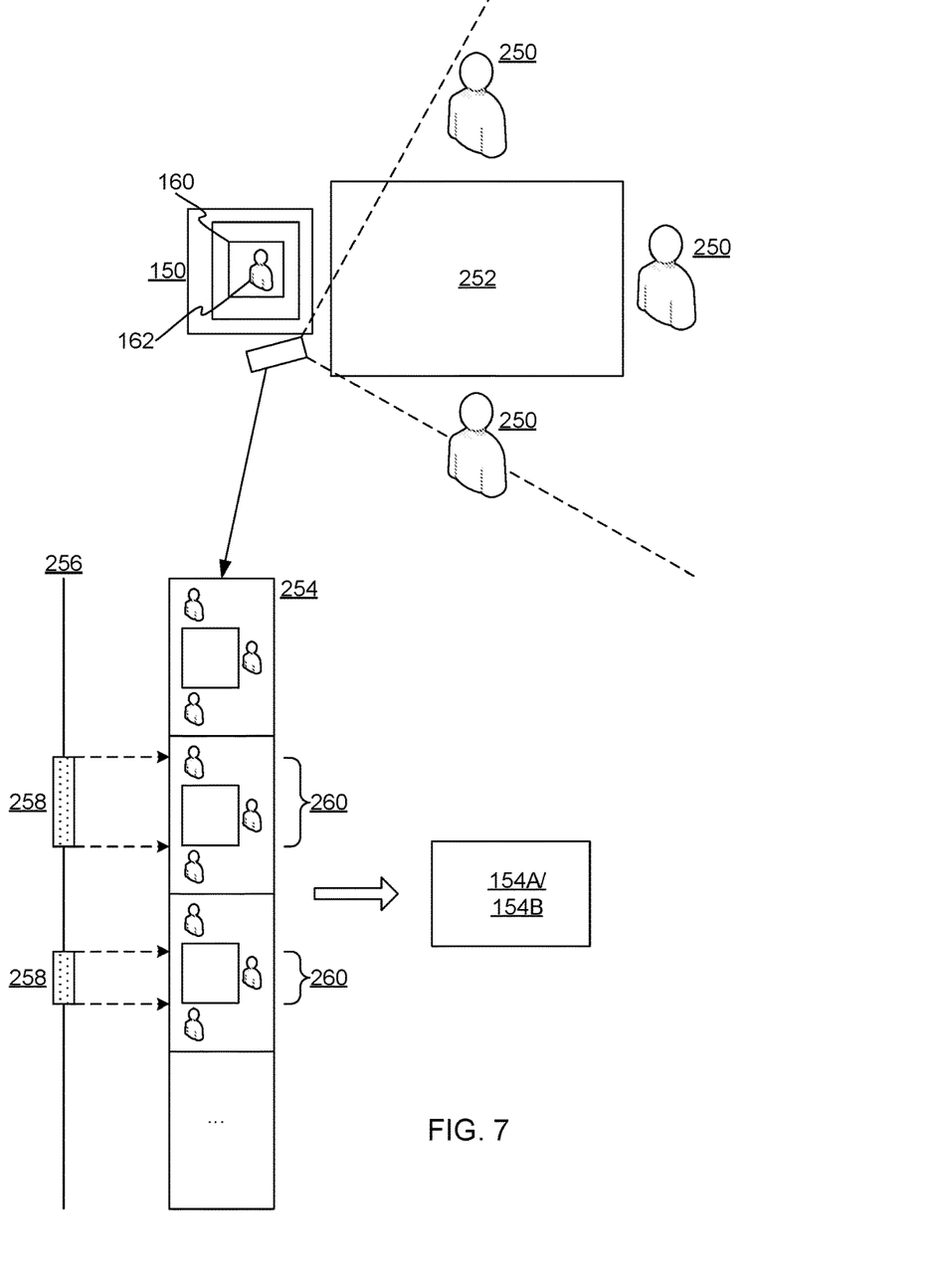
FIG. 7 shows how feedback can be captured or indexed.

FIG. 7 shows how feedback can be captured or indexed. At a meeting, participants 250 around a table 252 are at a meeting that includes a physical proxy device representing a participant, which includes at least display 160 displaying proxy representative 162. A video sequence 254 corresponds to the entire meeting. An index 256 has entries 258 that identify or correspond to portions 260 of the video sequence 254. In one embodiment, the portions 260 alone are stored in storage 154 in association with their corresponding pre-recorded video clips. In another embodiment, the entire video sequence 254 is stored in the storage 154 or elsewhere, and only the index entries 258 are stored in the storage 154 in association with their corresponding pre-recorded video clips.

Figure 8:
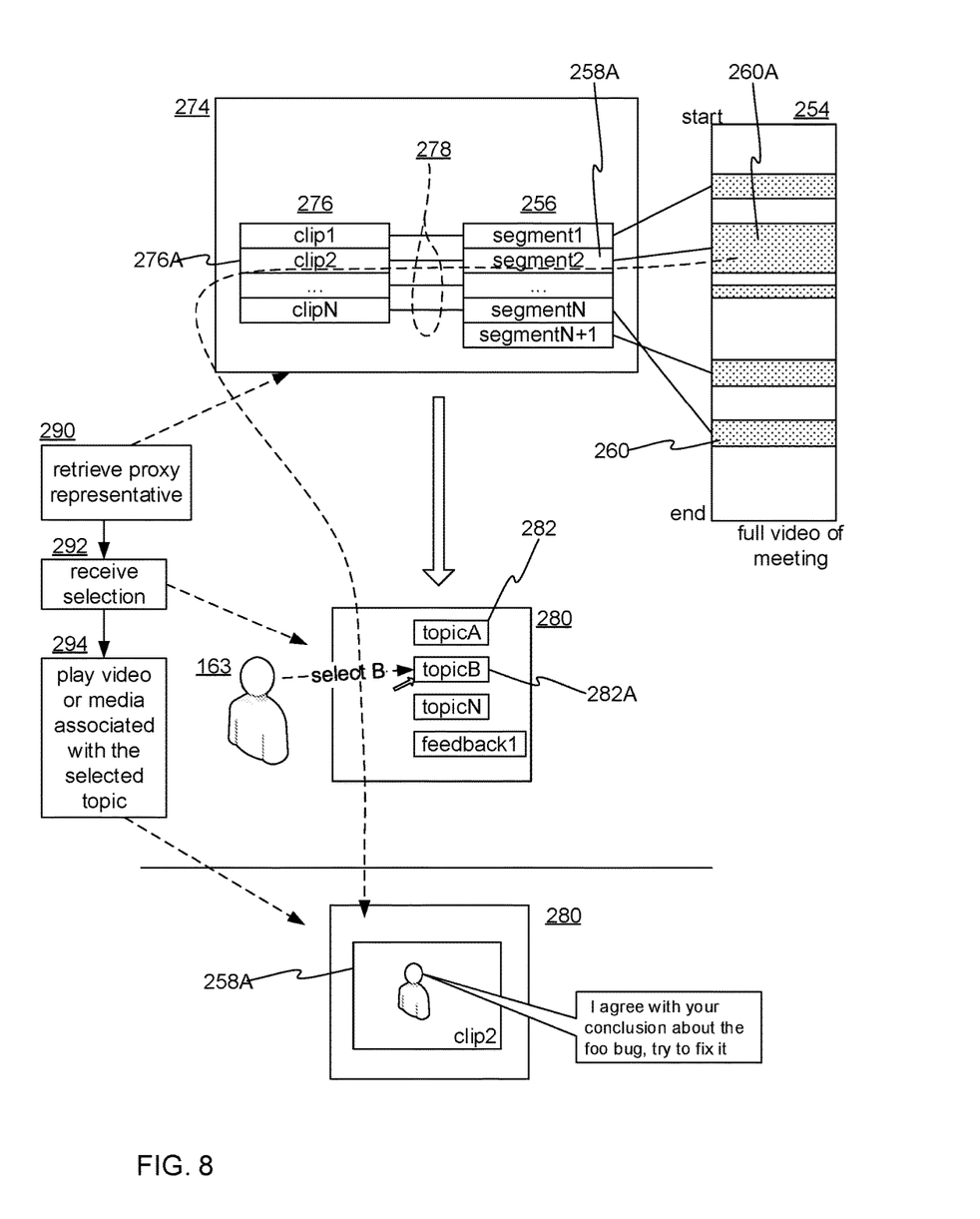
FIG. 8 shows use of feedback after a meeting.

FIG. 8 shows use of a proxy device after a meeting. After the meeting the represented participant 163 runs an application such as video conference software, e-mail software, etc., which displays a user interface and has either local or remote access to storage 274 containing video of the meeting as discussed above. The storage 274 has information that associates pre-recorded video messages played by the proxy representative/device with video segments of the meeting. In the example of FIG. 8, identifiers 276 of video clips have links 278 to the corresponding segments or portions 260 recorded from the meeting. When the represented participant 163 is ready to review the feedback obtained via the proxy device at the meeting, an application with access to storage 274 displays a feedback user interface 280. The feedback user interface 280 lists the topics 282 of the pre-recorded video messages and any impromptu feedback not associated with a pre-recorded message (e.g., "feedback1"). The list of topics may include graphics to indicate which of the pre-recorded messages were played during the meeting. An example usage will now be discussed.

At step 290 the interactions recorded during the meeting by the proxy device are retrieved by the application. That is, the application prepares any code or data needed to display any interactions or activities captured during the meeting, for instance, caching the recorded video messages. At step 292, the represented participant 163 selects a topic such as topicB 282A. The application looks up the corresponding topic or clip identifier, in this case clip2 276A. One of the links 278 points to segment2 258A and/or video portion 260A. At step 294 the proxy representative played the video associated with the selected topic; video portion 260A. In the lower half of FIG. 8, the selected segment or portion— segment2 258A—is played in the feedback user interface 280. Note that it is also possible for the represented participant 163 to select feedback not associated with a pre-recorded video clip of the proxy representative. For example, selecting "feedback1" might play segmentN+1.

It will be appreciated that feedback can be presented in numerous forms. For example, a timeline of the full meeting may be displayed, with highlights showing segments of the meeting that have feedback related to the proxy representative, perhaps color coded or labeled to indicate a corresponding topic. A highlight may be selected to play the corresponding segment and possibly show information about a related pre-recorded video message of the proxy representative.

As noted above, the proxy representative may have different appearances at different times. In addition to a basic default loop, a proxy representative may have a dynamically changing appearance according to detected conditions. For example if a microphone signal is weak perhaps indicating that participants are not speaking loudly enough, the proxy representative's avatar can change to a clip of the represented participant craning his neck or cupping her hand to her ear. If recording of feedback runs past a time limit, the avatar may change in appearance to a recording of the represented participant looking at his or her watch, etc.

After a meeting, both the attendees and the represented participant may be provided additional information to enhance communication. On one hand, the represented participant may be aided by information about how many or which messages were activated, how many people spoke after each played message, which messages had explicit feedback, etc. On the other hand, physically present participants who submitted feedback (explicitly or implicitly) might be provided with feedback about whether the represented participant reviewed the videos that were generated in the meeting. That is, meeting participants may be provided with feedback that recordings they made during the meeting were viewed. This may be in the form of email or some other visual display that communicates that the information generated at the meeting was consumed by the represented participant.

As mentioned above, proxy representative functionality can be integrated with a scheduling or teleconference system. In which case, it may be helpful to have a scheduling function to focus on an upcoming meeting within a specific timeframe. Just as the meeting itself may be scheduled, the represented participant may also have to schedule sessions for pre-recording comments and to review reactions and responses afterwards. Without such scheduling landmarks, the represented participant may not have the forcing function to give attention to a meeting in the same way that physically present participants would participate.

In another embodiment, feedback among the meeting participants is shared to encourage interaction around the topics of the meeting. The represented participant may wish other participants to be aware that comments have been pre-recorded for an upcoming meeting, and an advisory email may be sent to the participants before the meeting.

An implementation may be built using a standard three-tier architecture: a rich client, a web service, and a server back end. A rich client may provide the interface for recording and playing back videos. The video data can be stored on a web server and metadata for the videos may be stored in an SQL backend. This architecture may allow videos to be recorded and played back by the people included in a meeting using clients that interface directly with the video web service. The viewer client may be designed specifically for touch-based tablets for portability and ease of operation in a meeting.

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by a computing device comprised of storage hardware and processing hardware, the method comprising:

prior to a meeting that includes a second person, providing the computing device with access to: media clips of a first person and associations associating the media clips with respective clip topics, wherein each association associates one of the media clips and one of the clip topics, wherein the device renders audio and/or video content of the media clips;

during the meeting and while the computing device is rendering the media clips, monitoring, by the processing hardware of the computing device, actions of the second person to identify meeting topics as they arise during the meeting, the monitored actions comprising speech and/or manual inputs directed to the computing device;

during the meeting, comparing, by the processing hardware of the computing device, the identified meeting topics with the clip topics to determine when clip topics relate to meeting topics;

during the meeting, based on a meeting topic having been determined to relate to a clip topic, and based on one of the associations associating the clip topic with a media clip, rendering the media clip by the processing hardware device of the computing device; and during the meeting, recording to the storage hardware media portions of the second person and storing to the storage hardware indications indicating which media portions are associated with which rendering of which media clips, wherein each time one of the media clips is rendered: (i) recording of a corresponding media portion is started and stopped in correspondence with a start and stop of the media clip, and (ii) an indication indicating an association between a media portion and the clip topic is formed by the processing hardware and stored by the storage hardware.

2. A method according to claim 1, wherein the actions comprise speech of at least the second person, and wherein the actions are determined by analyzing the speech.

3. A method according to claim 1, wherein the actions comprise manual inputs directed to the computing device by the second person.

4. A method according to claim 1, wherein timings of rendering the media clips, respectively, depends on when the meeting topics are respectively determined to be related to the clip topics.

5. A method according to claim 4, wherein starts and/or extents of the media portions are determined according to when respective renderings of the media clips start or end.

6. A method according to claim 5, wherein formation of the media portions depends on when renderings of the media clips occur.

7. A method according to claim 6, wherein the media portions comprise discrete portions of media recorded during the meeting or locations within a same media recording recorded during the meeting.

8. A method performed by a computing device, the method comprising:

during a meeting in which a participant is present and participating, causing a device to operate to monitor changing context of the meeting during the meeting, the device having access to media messages of a person that were recorded by the person prior to the meeting, wherein each media message comprises a respective media clip and an indication of a respective target context for the media clip, and wherein the device renders the media clips;

during the meeting and while the computing device is rendering the media clips, the monitoring monitors the context of the meeting according to inputs to the computing device that correspond to actions of the second person, the inputs comprising voice or manual inputs;

during the meeting, according to the target contexts and the monitored context, determining when the target contexts correspond to the monitored context of the meeting, and each time a target context is determined to correspond to the monitored context, for the media message of the determined target context: (i) causing the media clip of the determined media message to be rendered by the device, and (ii) storing an association between the media message and a recording of a portion of the meeting that is associated with the rendering of the media clip, wherein starting and stopping of the recording are timed based on synchronized to starting and stopping of the media clip, respectively; and after the meeting, displaying a user interface that enables interactive selection of the media messages, wherein responsive to a media message being selected via the user interface, based on a corresponding one of the stored associations associating the media message and a recorded portion of the meeting, rendering the recorded portion of the meeting.

9. A method according to claim 8, wherein the actions comprise manual selections directed to the computing device and/or speech.

10. A method according to claim 8, wherein the causing comprises controlling a timing of rendering of the media clip according to target context having been determined to correspond to the monitored context of the meeting.

11. A method according to claim 8, wherein the media clips comprise video content.

12. A method according to claim 8, wherein the media clips comprise audio content.

13. A method according to claim 8, wherein the accessing comprises retrieving the media clips via a network from a server device.

14. A method according to claim 8, wherein the recorded portions of the meeting are formed to include portions of the meeting during which the media clips are being rendered.

15. A method according to claim 8, wherein the person does not attend the meeting.

16. A computing device comprising:

processing hardware;

storage hardware storing instructions configured to cause the processing hardware to perform a process, the process comprising:

monitoring voice or manual actions of one or more participants of a meeting during the meeting;

accessing first associations between media clips recorded prior to the meeting and trigger conditions of the media clips, each media clip having a first association with a respective trigger condition;

according to the monitoring, determining when the actions satisfy the trigger conditions, and based on each determination of an action satisfying a trigger condition, according to the first association of the satisfied trigger condition, rendering the media clip associated with the satisfied trigger condition; and forming feedback recordings of the meeting to capture feedback of the one or more participants to the renderings of the media clips, and storing second associations indicating which feedback recordings captured feedback for which of the media clips, wherein each feedback recording is formed by starting recording of the meeting in correspondence with starting rendering of the associated media clip.

17. A computing device according to claim 16, wherein the computing device further comprises a display, the media clips comprise respective video portions, and the renderings of the media clips comprises displaying the video portions on the display.

18. A computing device according to claim 16, wherein the process further comprises determining ends of the feedback recordings based on a fixed time duration following the respective renderings of the media clips or based on determinations that feedback of the one or more participants has ended.

19. A computing device according to claim 16, wherein the process further comprises providing a graphical user interface with access to the second associations to enable selection, in association with the media clips, for rendering, of the feedback portions, wherein the graphical user interface displays information indicating which media clips are associated with which feedback portions.

20. A computing device according to claim 16, wherein the trigger conditions comprise topics and the actions are automatically analyzed to determine when the topics arise during the meeting.

* * * * *